United States Patent
Wu et al.

(10) Patent No.: US 11,856,300 B2
(45) Date of Patent: Dec. 26, 2023

(54) METHOD FOR DETECTING INTERFERENCE PATTERNS FOR UNDER-SCREEN CAMERA, COMPENSATION METHOD AND CIRCUIT SYSTEM

(71) Applicant: REALTEK SEMICONDUCTOR CORP., Hsinchu (TW)

(72) Inventors: Yi-Jen Wu, Hsinchu (TW); Wen-Tsung Huang, Hsinchu (TW); Ching-Ju Hsiao, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 58 days.

(21) Appl. No.: 17/691,192

(22) Filed: Mar. 10, 2022

(65) Prior Publication Data

US 2023/0008899 A1    Jan. 12, 2023

(30) Foreign Application Priority Data

Jul. 8, 2021   (TW) ................................ 110125051

(51) Int. Cl.
| | |
|---|---|
| *H04N 23/71* | (2023.01) |
| *G06V 10/60* | (2022.01) |
| *G06T 7/73* | (2017.01) |
| *G06V 10/56* | (2022.01) |
| *G06T 7/68* | (2017.01) |
| *H04N 5/77* | (2006.01) |

(Continued)

(52) U.S. Cl.
CPC ............. *H04N 23/71* (2023.01); *G06T 7/68* (2017.01); *G06T 7/73* (2017.01); *G06T 7/90* (2017.01); *G06V 10/56* (2022.01); *G06V 10/60* (2022.01); *H04N 5/77* (2013.01); *H04N 23/53* (2023.01); *H04N 23/57* (2023.01); *G06T 2207/10024* (2013.01)

(58) Field of Classification Search
None
See application file for complete search history.

(56) References Cited

U.S. PATENT DOCUMENTS

2008/0181483 A1    7/2008   Seki
2020/0358937 A1*  11/2020   Nicholson .............. H04N 23/64

FOREIGN PATENT DOCUMENTS

CN          211428197 U        9/2020

* cited by examiner

*Primary Examiner* — James M Hannett
(74) *Attorney, Agent, or Firm* — Li & Cai Intellectual Property (USA) Office

(57) ABSTRACT

A method for detecting interference patterns for an under-screen camera, a compensation method and a circuit system are provided. The circuit system includes an image-processing circuit and an under-screen camera module. The under-screen camera module captures an image by a lens through a glass substrate of a display module. After receiving the image, the image-processing circuit detects and compensates an interference pattern. In the method, multiple reference points are set in the image, and a brightness average value and a brightness target value for each of the reference points are obtained for calculating an area brightness ratio of the reference points. A binarized image is then obtained. The interference pattern is determined according to symmetrical characteristics of the binarized image. A target matrix is decided for compensating the interference pattern according to weights of all of the reference points of the image.

20 Claims, 16 Drawing Sheets

(51) Int. Cl.
*G06T 7/90* (2017.01)
*H04N 23/53* (2023.01)
*H04N 23/57* (2023.01)

METHOD FOR DETECTING INTERFERENCE PATTERNS FOR UNDER-SCREEN CAMERA, COMPENSATION METHOD AND CIRCUIT SYSTEM

CROSS-REFERENCE TO RELATED PATENT APPLICATION

This application claims the benefit of priority to Taiwan Patent Application No. 110125051, filed on Jul., 8, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of processing interference patterns in an image, and more particularly to a method for detecting interference patterns in an image captured by an under-screen camera, a compensation method, and a circuit system.

BACKGROUND OF THE DISCLOSURE

A mobile device usually includes a camera module. In general, a lens of the camera module is required to be exposed. However, for the design of a mobile device having a full-screen display, it is necessary to form a hole on a transparent surface that can be a thin-film transistor (TFT) panel, an optical film, or a surface glass, or alternatively, a dedicated space is reserved for exposing the lens of the camera module for taking a picture or a video.

In order to allow a full-screen display to reveal a full display range, under-screen cameras are provided in mobile devices in the conventional technology. The under-screen camera is such as one shown in a schematic diagram of FIG. 1, in which a camera module 10 is configured to be disposed under a full-screen display panel 100. The camera module 10 includes a photosensor 103 and a lens 101, and the lens 101 is packaged in a packaging structure of the full-screen display panel 100.

However, an image taken by the under-screen camera may have an interference pattern because the lens 101 is disposed under a surface glass and the image is taken by the under-screen camera through the surface glass. The interference pattern shown in FIG. 2 is known as Newton's rings, and is usually shown as a rainbow ring that is a kind of interference fringe.

The Newton's rings' appearance in the image taken by the under-screen camera is due to optical path differences between an incident light and a reflective light passing through a multilayer structure of the full-screen display panel 100. It should be noted that the optical path difference is caused by single-wavelength light passing through curved surfaces having slits among different layers the multilayer structure having different materials of the full-screen display panel 100. If a concentric air film at the same radius has the same thickness, the above-mentioned optical path difference will result in a circular pattern in the image taken by the under-screen camera. The rainbow-like rings are formed when the light source has different wavelengths.

It should be noted that the closer the light source is to a single wavelength light, the more obvious an interference phenomenon is. Under a specific light source, an issue of the interference phenomenon cannot be solved by using a fixed correction value since a time coherence of the interference phenomenon results in changes of the positions of the bright and dark stripes of the Newton's rings.

SUMMARY OF THE DISCLOSURE

In view of the technical inadequacy in which the conventional under-screen camera may produce Newton's rings (also known as rainbow rings) due to interference phenomena caused by the structural design (e.g., materials, gaps and thicknesses of the structure) of a display panel when the conventional under-screen camera captures an image through the display panel, the present disclosure provides a method for detecting interference patterns for the under-screen camera, a compensation method and a circuit system. The detection and compensation of the interference patterns can be performed through image processing techniques. The method for compensating the interference patterns can be performed based on image features of the interference patterns, and in particular, the interference patterns can be dynamically compensated based on the changes of various light sources.

In an aspect of the present disclosure, the circuit system includes an image-processing circuit and an under-screen camera module. The under-screen camera module is disposed inside a display module. The under-screen camera module captures an image via lens of the under-screen camera module through a glass substrate of the display module. The image is transferred to the image-processing circuit for detecting and compensating the interference patterns.

The method for detecting and compensating interference patterns includes setting multiple reference points in the image, setting up a first area with respect to each of the reference points, calculating a brightness average value of the first area for each of the reference points, setting up a second area with respect to each of the reference points, calculating a brightness target value of the second area for each of the reference points, and calculating an area brightness ratio by referring to the brightness average value and the brightness target value of each of the reference points. A binarized image can then be obtained according to the area brightness ratios of all of the reference points. An interference pattern can be determined based on symmetrical characteristics of the interference pattern in the image. A weight value is determined. A target matrix can be obtained based on the weight value with respect to each of the reference points. The target matrix describes compensation coefficients of all of the reference points in the image so as to compensate the interference patterns.

Preferably, if the brightness target value is larger than the brightness average value, it is determined that there are dark stripes near a corresponding reference point; if the brightness target value is smaller than the brightness average value, it is determined that there are bright stripes near the corresponding reference point. The area brightness ratio equals to the brightness target value being divided by the brightness average value.

Preferably, the interference pattern can be a Newton's ring, in which the Newton's ring has wider rings near a central portion, and thinner rings away from the central portion. The reference points have the same first area but the larger second area for the portion closer to the central portion of the Newton's rings.

Further, conditions that satisfy the symmetrical characteristics of the binarized image that is determined to have the interference pattern include: numbers of black dots and white dots at a junction of a black area and a white area of the binarized image are the same; and positional deviations of center points calculated from junctions of a plurality of rings of the interference pattern is not larger than a deviation threshold.

Moreover, the positions of interference patterns in red channel, green channel and blue channel of the image are different. The area brightness ratios with respect to different color channels for each of the reference points are calculated. Interference pattern compensation is performed on the different color channels of the image when a target matrix for the color channels is obtained.

Further, the target matrix describes the compensation coefficients of each of the reference points in the image. A bilinear interpolation method can be used to correct each of the color channels of every pixel of the image so as to compensate the interference pattern of the image.

In addition, multiple target matrices can be used for dynamically compensating the interference patterns by switching the multiple target matrices.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
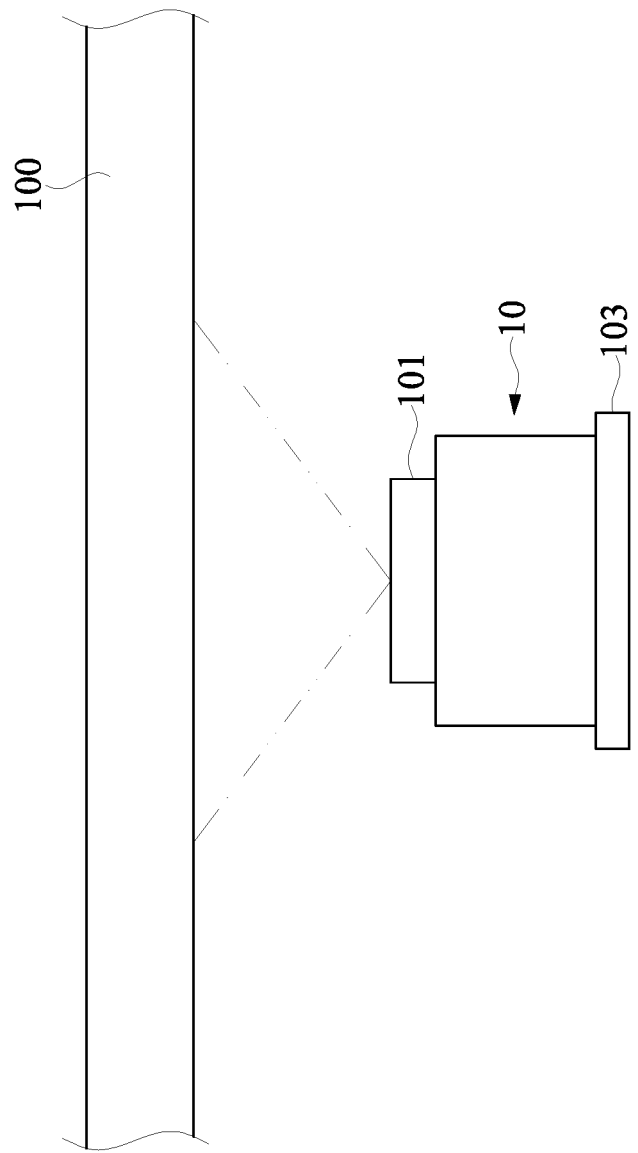
FIG. 1 is a schematic diagram depicting a structure of an under-screen camera in one embodiment of the present disclosure.
Figure 2:
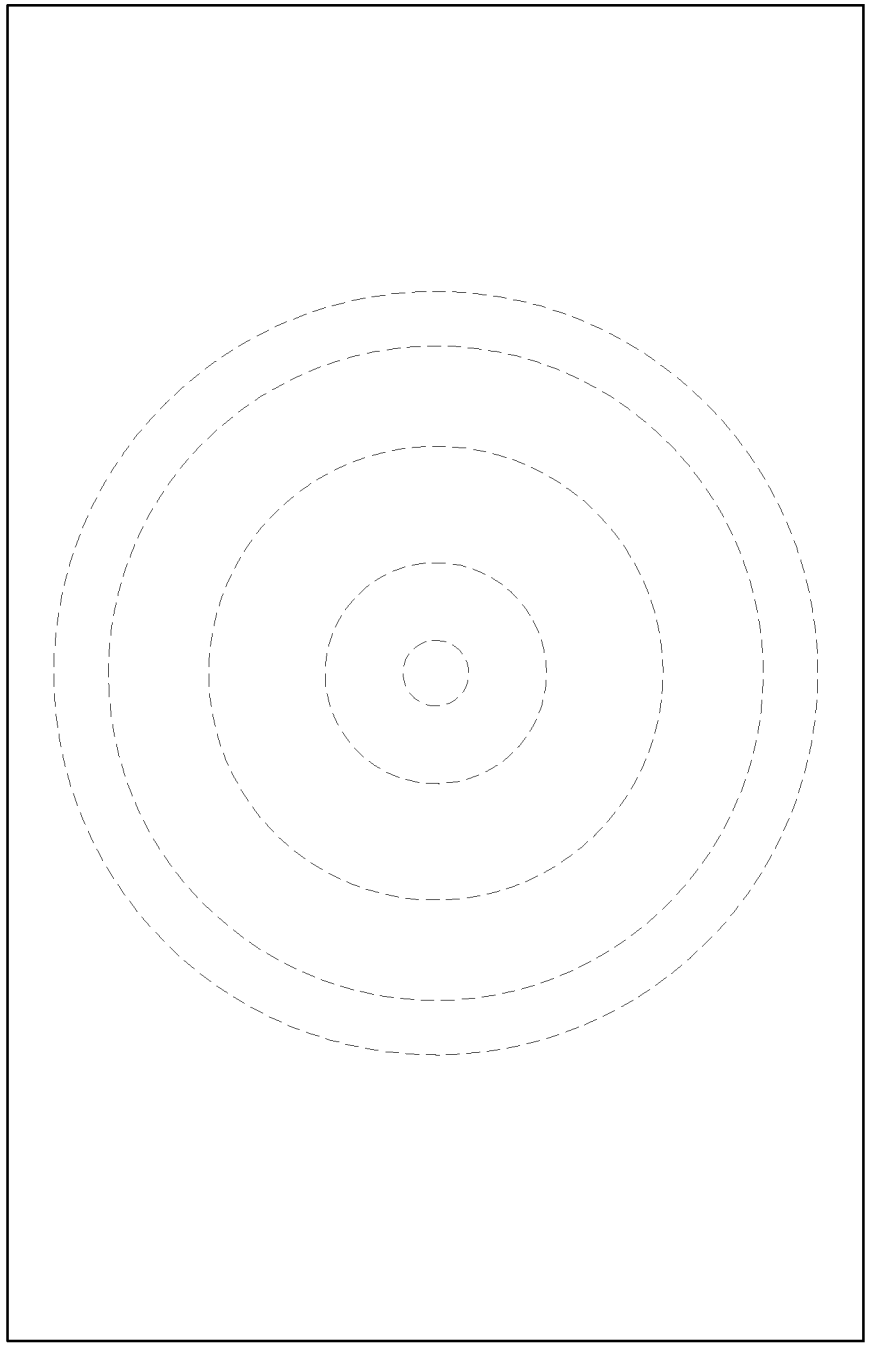
FIG. 2 is a schematic diagram exemplarily depicting Newton's rings.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

For solving the problem of an interference pattern occurring in an image taken by an under-screen camera, the present disclosure is related to a method for detecting the interference patterns for the under-screen camera, a compensation method and a circuit system. The interference patterns are such as circular interference patterns that form the Newton's rings, also known as rainbow rings. The image taken by the under-screen camera may have the interference patterns because of the interference phenomena caused by structural materials, gaps among the layers in the structure and thicknesses of the display panel. The interference pattern can be detected according to image features such as multiple alternating bright and dark circular interference stripes. Because the brightness distribution of the image can be referred to for detecting the interference patterns, the method can particularly be used to conduct dynamic compensation adaptive to changes in light sources.

The method is performed in an image-processing circuit. The image-processing circuit can be used for processing images taken using the under-screen camera. The under-screen camera can be used in a mobile device. One of the objectives of the method for detecting interference patterns is to eliminate the interference patterns of the image through an image-processing process. Various light sources may cause different degrees of interference patterns. For example, the interference phenomena may be obvious if the light emitted from a light source is close to a single wavelength light. With the Newton's rings as an example, a circular interference pattern formed by bright and dark stripes is obvious when a U30 light source having a color temperature of 3000K is used. However, the Newton's rings may not be so obvious under a specific circumstance with a specific light source. Furthermore, the interference pattern cannot be solved by a fixed correction value even under the same light source since the positions of the bright and dark stripes forming the interference pattern can be changed due to temporal coherence of the interference phenomena.

Figure 3:
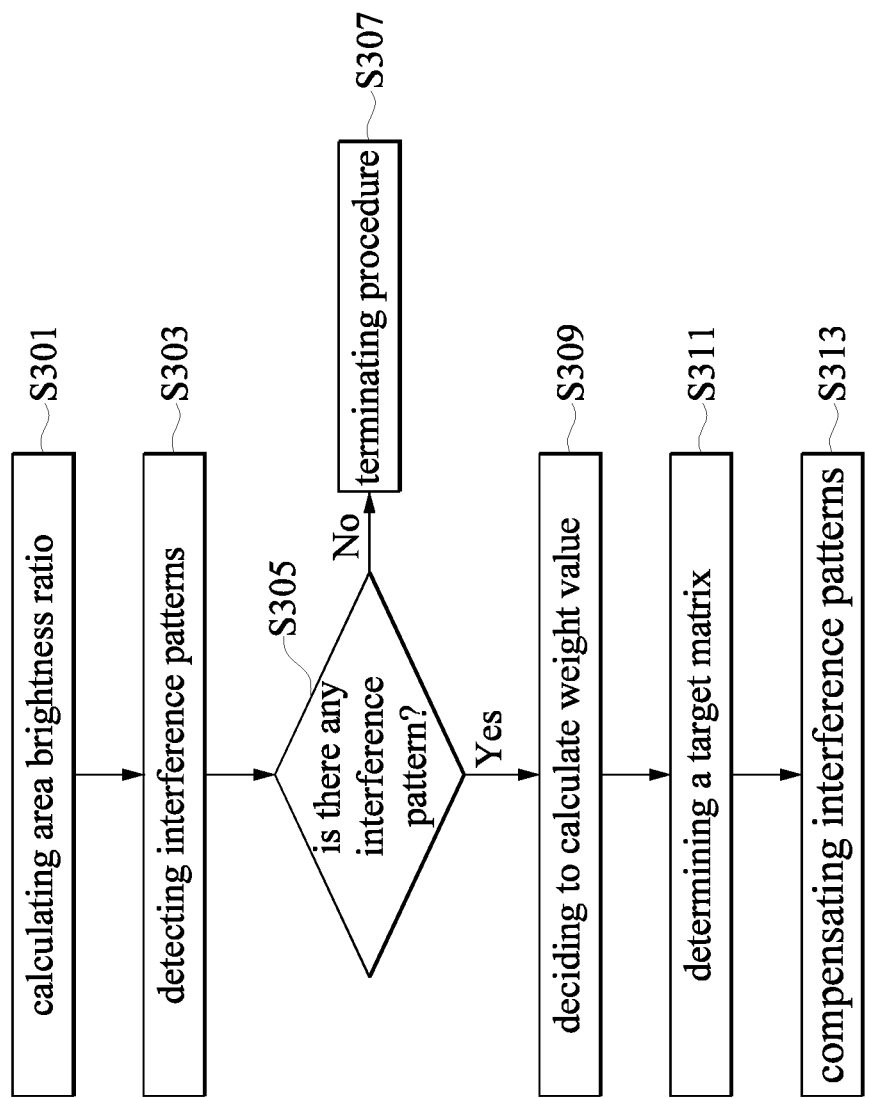
FIG. 3 is a flowchart describing a method for detecting interference patterns for the under-screen camera and compensating the interference patterns by dynamically deciding a target matrix according to one embodiment of the present disclosure.

According to one embodiment of the method for detecting interference patterns for the under-screen camera and the compensation method, reference is made to a flow chart of FIG. 3, in which the compensation method implements a dynamic compensation for adapting to changes in different light sources.

Figure 4:
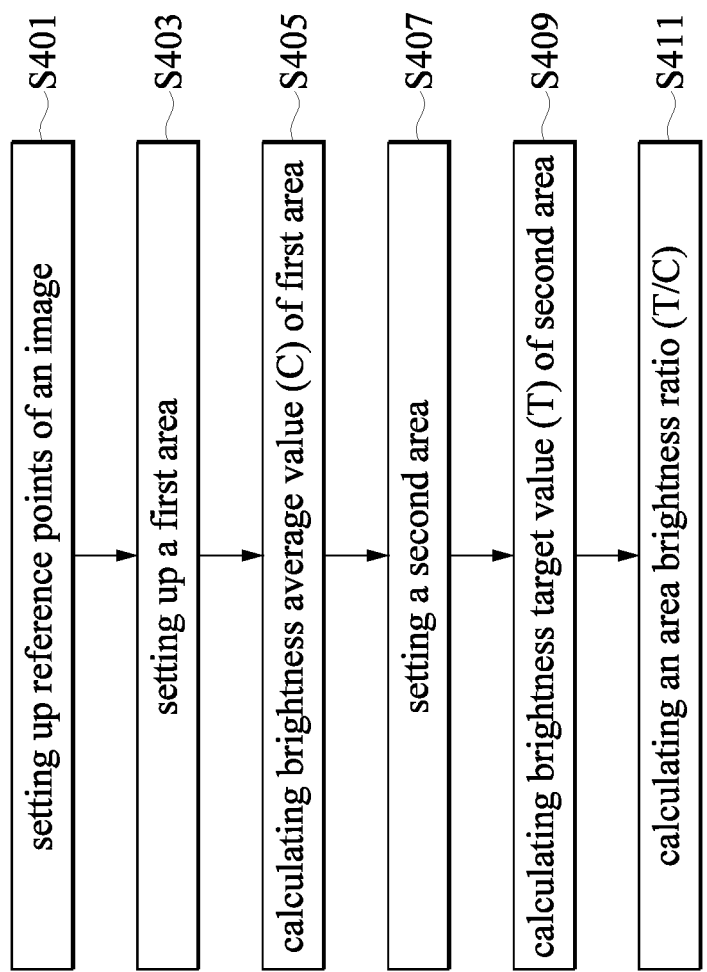
FIG. 4 is a flow chart describing a process of calculating an area brightness ratio in one embodiment of the present disclosure.

In the beginning, such as step S301 of FIG. 3, an image is divided into multiple areas, and an area brightness ratio with respect to each of the areas is calculated. The area brightness is calculated by averaging brightness values of the multiple areas. FIG. 4 is a flow chart describing a process of calculating the area brightness ratio. In step S401, referring to FIG. 5, M×N reference points are set in the image. Each of the reference points indicates a certain range of area of the image. In step S403, a square having an appropriate size with respect to each of the reference points is determined and a first area is accordingly decided. In the schematic diagram, a first area 51 with respect to a reference point 501 is chosen, and another first area 52 with respect to another reference point 502 is also chosen. Accordingly, the first areas corresponding to the other reference points are also set in the same way. Next, such as in step S405, a brightness average value (C) for ranges covered by the first area (51, 52) with respect to the reference point (501, 502) is calculated.

Figure 5:
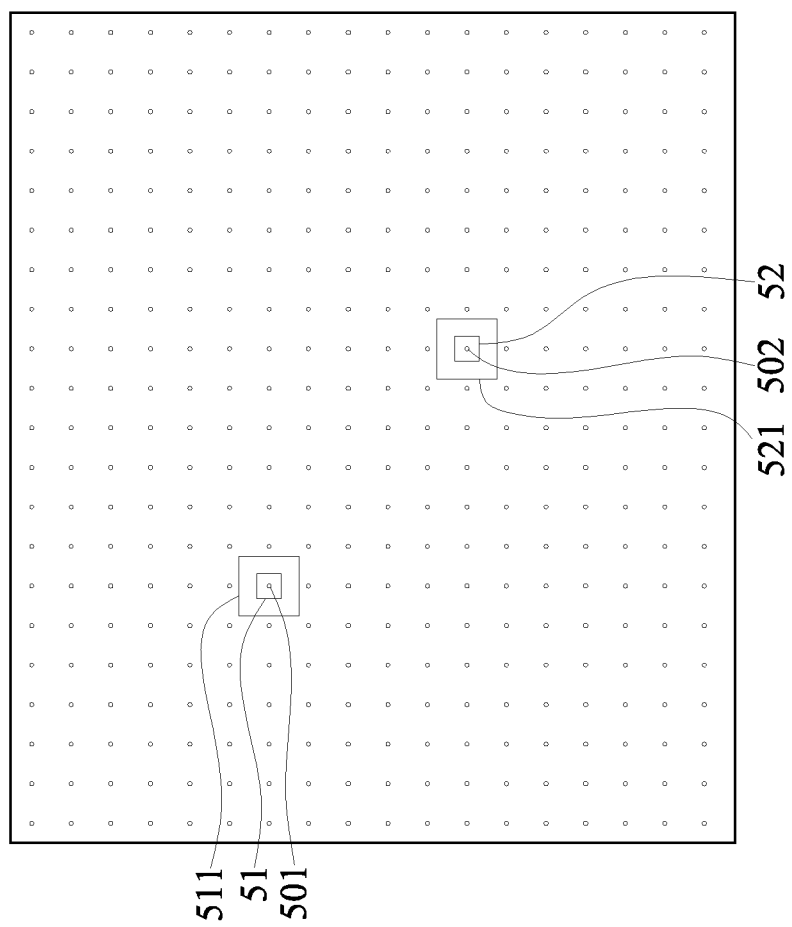
FIG. 5 is a schematic diagram of setting M×N reference points in an image according to one embodiment of the present disclosure.

In step S407, a second area with respect to each of the reference points can then be set based on an actual condition of the interference pattern. In FIG. 5, a second area 511 with respect to the reference point 501 and another second area 521 with respect to the reference point 502 are shown. The framed and selected second areas 511 and 521 shown in the diagram indicate ranges of areas for calculating a brightness target values (T) for the reference points. In step S409, the brightness target value (T) is calculated according to pixel values of the second area (511, 521) with respect to the reference point (501, 502).

The brightness average value (C) and the brightness target value (T) with respect to each of the reference points are accordingly obtained. If the brightness target value (T) is larger than the brightness average value (C), then dark stripes are present in the area near the corresponding reference point. On the contrary, if the brightness target value (T) is smaller than the brightness average value (C), it is determined that bright stripes are present near the corresponding reference point. At this time, such as in step S411, the brightness target value (T) and the brightness average value (C) for each of the areas are referred to for calculating an area brightness ratio. For example, the area brightness ratio (T/C) equals to the brightness target value (T) divided by the brightness average value (C). Therefore, for compensating the interference pattern, pixel values of dark stripes can be multiplied by the area brightness ratio which is larger than 1 (T/C>1), and pixel values of bright stripes can be multiplied by the area brightness ratio which is smaller than 1 (T/C<1).

Figure 6:
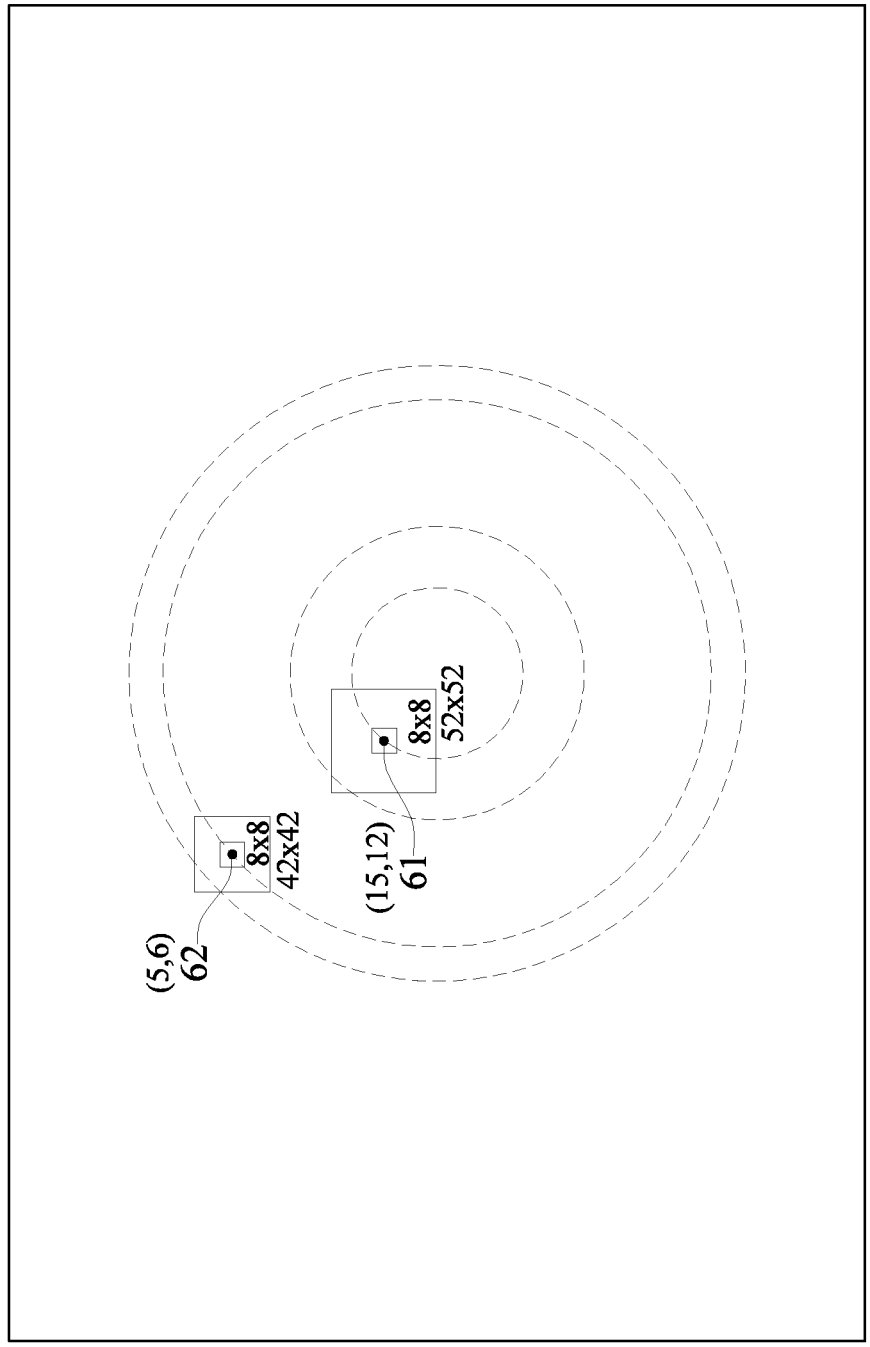
FIG. 6 is a schematic diagram depicting different coverages of each of the reference points in the image in one embodiment of the present disclosure.

It should be noted that a size of the first area or the second area can be selected according to the bright and dark stripes of the interference pattern under different light sources. The size of the areas should be appropriate and dynamically changed based on actual need. If the selected area is too small, noises in the image may be shown. With the Newton's rings as an example, a central portion of the Newton's rings may show wider rings formed by the bright and dark stripes, and thinner rings may be shown at a portion away from the center of the Newton's rings. In FIG. 5, the ranges covered by the second areas 511 and 521 can be decided according to distances from a center of the image to the areas. The central portion of the interference pattern corresponds to the position of the under-screen camera disposed under the display panel. Therefore, the central portion of the image can also be the central portion of the Newton's rings, and the second areas 511 and 521 may require a larger area of coverage. For example, reference is made to FIG. 6, a first reference point 61 (having coordinates of (15, 12)) near the central portion of the image and a second reference point 62 (having coordinates of (5, 6)) away from the central portion have a same size of the first area, e.g., 8×8 pixels. However, a second area (52×52 pixels) with respect to the first reference point 61 near the central portion of the image is larger than another second area (42×42 pixels) with respect to the second reference point 62 away from the central portion of the image. Afterwards, an area brightness ratio (T/C) is calculated. The area brightness ratio (T/C) obtained at the bright stripe with respect to the second reference point 62 is 0.977, and the area brightness ratio (T/C) obtained at the dark stripe with respect to the first reference point 61 is 1.043.

Further, since the positions of the interference patterns formed in a red channel image, a green channel image and a blue channel image are different, the area brightness ratios (T/C) should be calculated separately. Therefore, the brightness average values (C), the brightness target values (T) and the area brightness ratios (T/C) for different color channels (e.g., the red channel, the green channel and the blue channel) of the image are calculated separately. With the reference points shown in FIG. 5 as an example, M×N reference points are set in an image. Each of the reference points has an area brightness ratio (T/C) for each of the red, green and blue channels. Therefore, the compensation may also be performed for each of the color channels.

Figure 7:
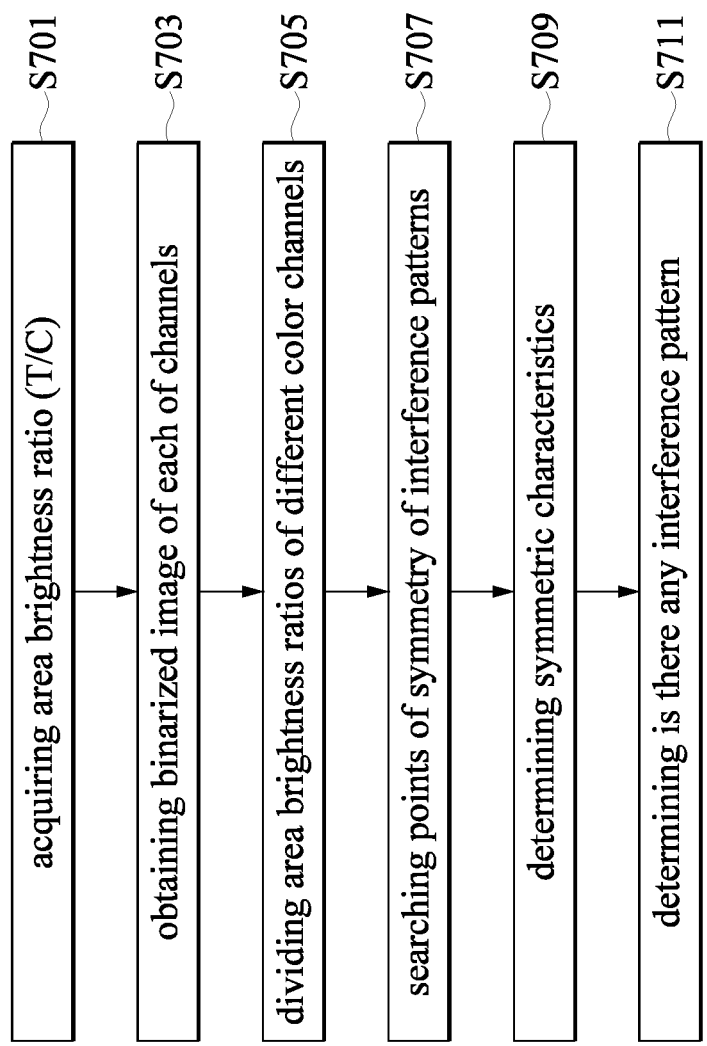
FIG. 7 is a flow chart describing a method for detecting interference patterns according to one embodiment of the present disclosure.

After the area brightness ratio (T/C) for each of the reference points is calculated, such as in step S303 of FIG. 3, the interference pattern, e.g., a circular interference pattern, can be detected. The method can be performed only on a light source environment that produces the interference pattern so as to detect and compensate the interference pattern, and ignore a light source environment that does not produce the interference pattern. Therefore, for adapting to changes in the light source environment, the interference pattern is detected in advance. Reference is made to FIG. 7, which is a flow chart describing a process of detecting the interference pattern according to one embodiment of the present disclosure.

In step S701, area brightness ratios (T/C) for the color channels with respect to each of the reference points are calculated. In step S703, a binarized image is generated. According to the above embodiments, the area brightness ratios (T/C) with respect to each of the reference points are referred to so as to generate a M×N binarized image. Thus, the method relies on the symmetrical characteristics of the binarized image to determine whether or not the image includes an interference pattern. However, a false determination may occur in determining the symmetrical characteristics of the interference pattern when the determination is based only on a binarization result of the area brightness ratio, because the interference pattern may not be obvious in the image. Therefore, such as in step S705, the area brightness ratios of different color channels can be divided with each other for highlighting the boundaries of the interference pattern so as to improve an accuracy of detecting the interference pattern.

Figure 8C:
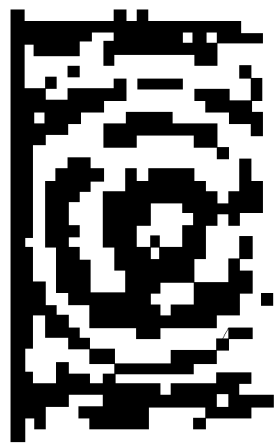
FIGS. 8A, 8B and 8C are schematic diagrams of binarized images obtained through the area brightness ratios of different color channels of the image according to one embodiment of the present disclosure.
Figure 8B:
Figure 8A:
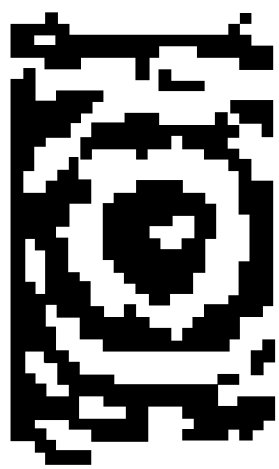
Figure 9C:
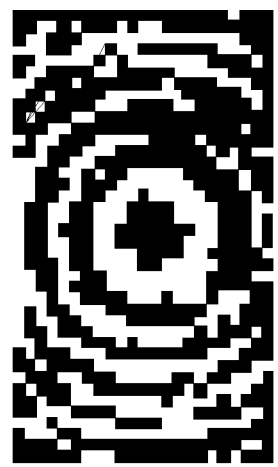
FIGS. 9A, 9B and 9C are schematic diagrams of binarized images obtained by dividing the area brightness ratios of the different color channels of the image according to one embodiment of the present disclosure.
Figure 9B:
Figure 9A:
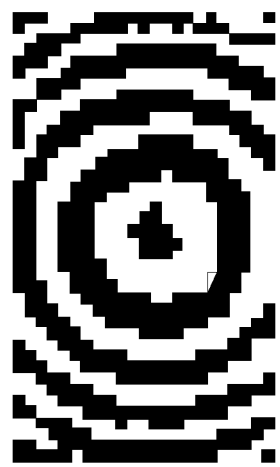

FIGS. 8A, 8B and 8C show three binarized images obtained from area brightness ratios of the red channel, the green channel and the blue channel, respectively. FIGS. 9A, 9B and 9C also show three binarized images obtained by dividing the area brightness ratios of the color channels of the image with each other. It is easier to determine the interference pattern from the binarized images if differences of the wavelengths in different color channels are larger. For example, in FIG. 9A, a binarized image is obtained by dividing the area brightness ratio of the green channel by the area brightness ratio of the red channel (G/R); in FIG. 9B, another binarized image is obtained by dividing the area brightness ratio of the blue channel by the area brightness ratio of the red channel (B/R); and in FIG. 9C, one further binarized image is obtained by dividing the area brightness ratio of the green channel by the area brightness ratio of the blue channel (G/B). Comparing with the binarized images shown in FIGS. 8A, 8B and 8C, the binarized images shown in FIGS. 9A, 9B and 9C can improve accuracy of detecting the interference pattern.

Figure 10:
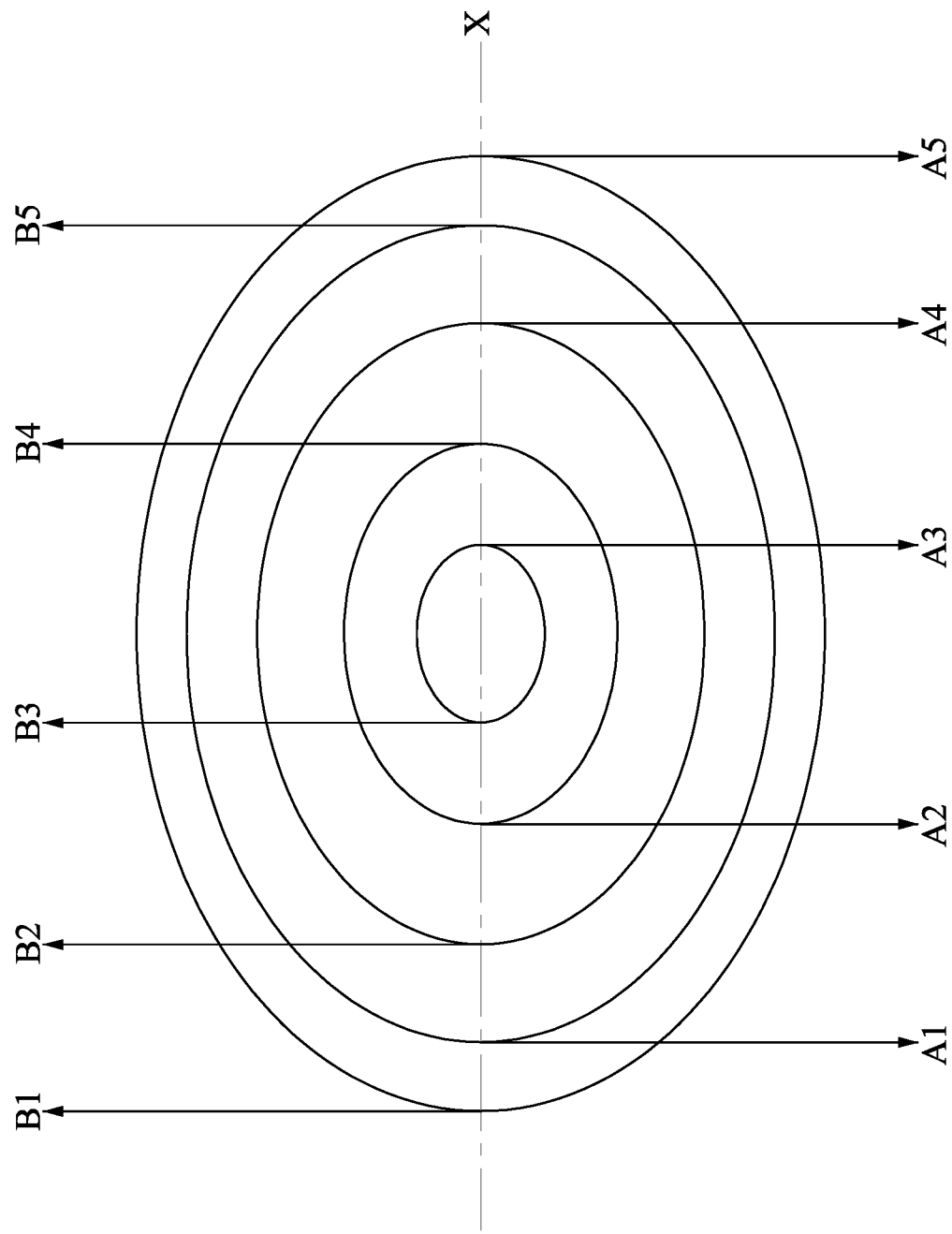
FIG. 10 is a schematic diagram depicting an example of searching points of symmetry in a circular interference pattern.

After the binarized images are obtained, such as in step S707, points of symmetry can be searched based on the symmetrical characteristics of the interference pattern, such that the symmetrical characteristics are determined (step S709), and by which the interference pattern in the image can be detected. Reference is made to FIG. 10, which is a schematic diagram depicting searching the points of symmetry of a circular interference pattern, and can be read in conjunction with FIG. 11, which is a flow chart describing a process of determining the symmetrical characteristics according to one embodiment of the present disclosure.

FIG. 10 schematically shows a binarized circular interference pattern. In the process, a plurality of junction points indicative of white dots intersecting with black dots can be searched by scanning the image along an X axis (step S111 of FIG. 11). For example, the black dots are selected, and the junction points B1, B2, B3, B4 and B5 can be sequentially marked (i.e., from left to right). Further, a plurality of junction points indicative of black dots intersecting with white dots can also be searched by scanning the image along the X axis. When the white dots are selected, the junction points A1, A2, A3, A4 and A5 can be sequentially marked (i.e., from left to right). Therefore, numbers of the black dots and the white dots can be obtained (step S113 of FIG. 11). A circular interference pattern can be determined to be present in the image accurately if the symmetrical characteristics meet features of the circular interference pattern. The circular interference pattern can be confirmed to be present in the image based on several conditions. A first condition is as follows: the number of points A (e.g., A1 to A5) should be the same as the number of points B (e.g., B1 to B5). If the first condition is met, a next step of calculating a center point for each of the rings is performed. The circular interference pattern of the present example has five rings arranged in a direction from outside to inside.

Figure 11:
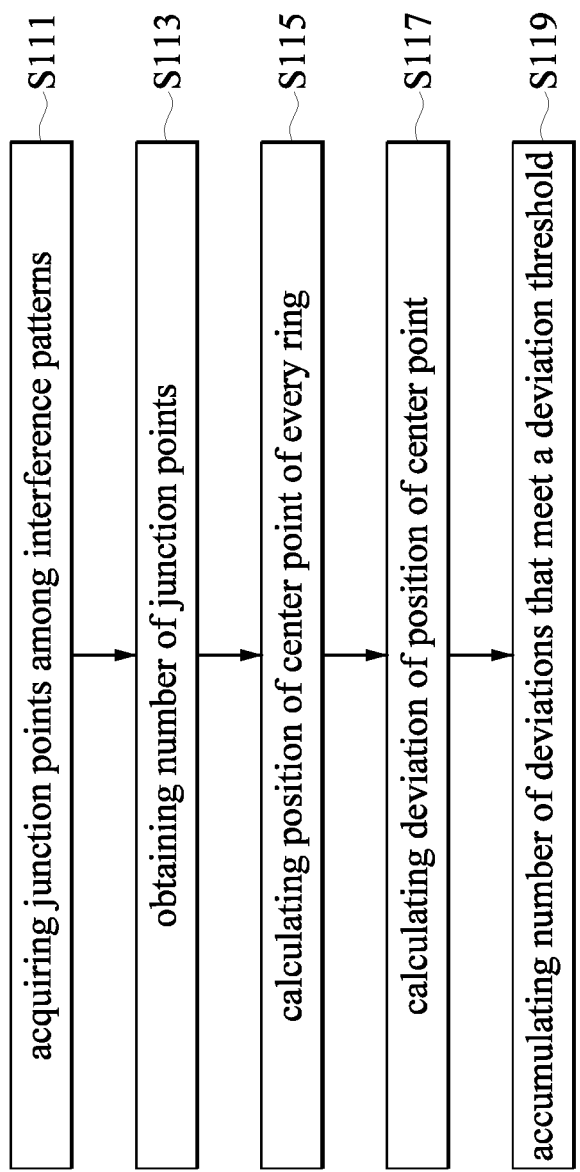
FIG. 11 is a flow chart describing a process of determining symmetrical characteristics of an image in one embodiment of the present disclosure.

In a next step, positions of the center points of the five rings are calculated (step S115 of FIG. 11). The positions of the center points of the five rings can be calculated when positions of boundaries of the rings are obtained along the X axis. In the exemplary example shown in FIG. 10, for a point B1 at a left boundary and a point A5 at a right boundary of a first ring, the position of a center point between the point B1 and the point A5 is represented as "(B1+A5)/2", and the center point between the points B1 and A5 should be close to a center point of the interference pattern. For a point A1 at a left boundary and a point B5 at a right boundary of a second ring, the position of a center point between the point A1 and the point B5 is represented as "(A1+B5)/2", and the center point between the points A1 and B5 should also be close to the center point of the interference pattern. Further, the center point between the point B3 at the left boundary and the point A3 at the right boundary of the fifth ring is represented as "(A3+B3)/2." The rest may be accordingly calculated, and the center points of all of the rings can be calculated one-by-one until the last ring that is closest to the center point of the interference pattern. It should be noted that the center points of the five rings should be substantially equal to the center point of the M×N binarized image. In the present example, only the center points along the X axis are searched, but the method can also be adapted to search the center points along a Y axis.

A second condition is as follows: the interference pattern should have the symmetrical characteristics. The method is able to determine whether or not any of the symmetrical characteristics of the image is present according to deviations of the center points to be calculated from the positions of the junction points in each of the rings (step S117 of FIG. 11). According to one embodiment of the present disclosure, a deviation threshold (k1) can be preset, and the positional deviations of the center points of all of the rings should be smaller than the deviation threshold (k1) such that the symmetrical characteristics can be determined. In one further embodiments of the present disclosure, the positional deviations of the center points calculated from the boundary points of the rings can be accumulated. The number of the deviations smaller than the deviation threshold (k1) can be counted (step S119 of FIG. 11). The accumulated number can be used to determine if an interference pattern is present. The interference pattern particularly refers to the circular interference pattern, i.e., the Newton's rings.

According to the embodiment as represented by the process described in FIG. 7, in step S711 of determining whether or not any interference pattern is present, an accumulated number threshold (k2) is provided. If the accumulated number of the accumulated deviations that meet the deviation threshold (k1) is equal to or larger than the accumulated number threshold (k2), the image matches with features of the interference pattern. Therefore, the image is determined to include the circular interference pattern. Otherwise, the image does not include the circular interference pattern if the accumulated number fails to reach the accumulated number threshold (k2).

Referring back to the flow chart of FIG. 3, the process described in FIG. 7 is used to determine whether or not the image includes the interference pattern (step S305 of FIG. 3). If it is determined that the image does not include the interference pattern, the process is terminated (step S307 of FIG. 3). If the image includes the interference pattern, the interference pattern present in the image can be compensated.

Figure 12:
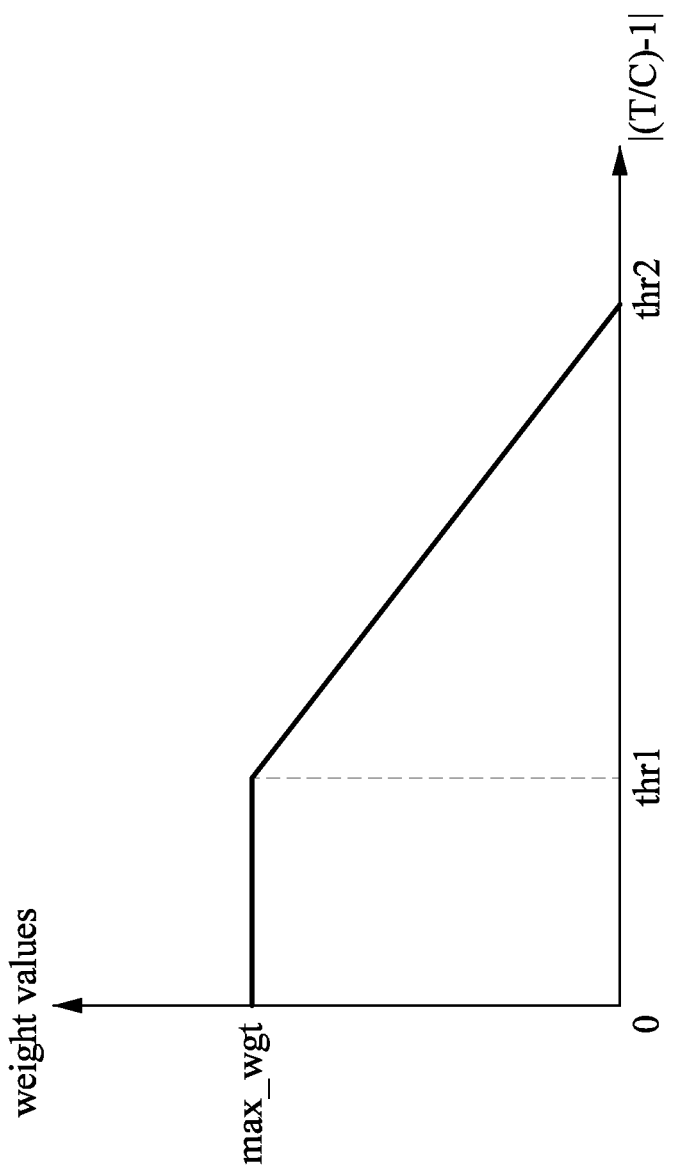
FIG. 12 is a curve diagram used to determine weight value corresponding to the area brightness ratio in one embodiment of the present disclosure.

Further, in the process described in FIG. 3, a weight value is determined for each of the area brightness ratios (T/C). The weight value is set for highlighting the portion with bright and dark stripes in the interference pattern in order to eliminate possible misjudgments (step S309 of FIG. 3). It should be noted that, in a gray image, an area brightness ratio (T/C) with respect to the reference point that is calculated in step S301 is close to 1. If the image includes an object with a boundary, the area brightness ratio is far from 1. FIG. 12 shows a diagram depicting a relation curve that is referred to for determining a weight value corresponding to an area brightness ratio. The vertical axis of the relation curve denotes weight values having a maximum weight value (max_wgt), and the horizontal axis of the relation curve denotes absolute values of the area brightness ratios subtracting 1 (|(T/C)−1|). A first threshold (thr1) and a second threshold (thr2) are set for |(T/C)−1|. A weight value is determined according to the value of |(T/C)−1| with respect to each of the reference points. If the value of |(T/C)−1| is equal to or smaller than the first threshold (thr1), the weight value is set to a maximum weight value; if the value of |(T/C)−1| is equal to or larger than the second threshold (thr2), the weight value is set to 0. If the value of |(T/C)−1| is between the first threshold (thr1) and the second threshold (thr2), the weight value can be obtained through an interpolation method. The relation curve can effectively eliminate unreliable results of the determination, for example, after accumulation, a value that matches with the features of interference pattern is confirmed and adopted for calculation.

Figure 13:
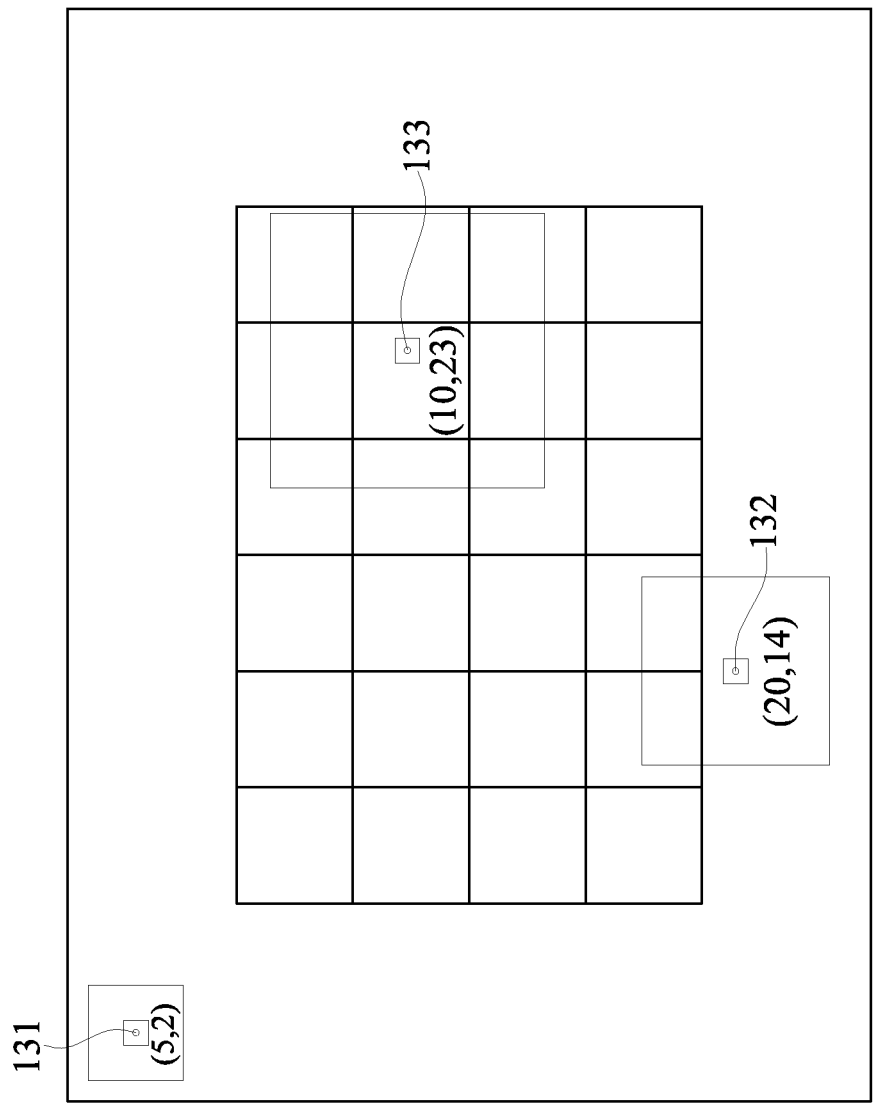
FIG. 13 shows an exemplary example of an image.

For example, the maximum weight value (max_wgt) is 0.5, the first threshold (thr1) is 0.05 and the second threshold (thr2) is 0.08. Reference is also made to FIG. 13, which shows an exemplary image for detecting the interference patterns therein. In the diagram, a first reference point (having coordinates of (5,2)) 131 is located within a gray area, therefore, an area brightness ratio (T/C) of the gray area is close to 1. An absolute value of a difference between the area brightness ratio and 1 is 0.008 (|(T/C)−1|=0.008) and is smaller than the first threshold (thr1). Therefore, a weight value is set to the maximum weight value of 0.5. A second area for a second reference point (having coordinates of (20,14)) 132 covers a color block of the image. An absolute value of the difference between the area brightness ratio and 1 (|(T/C)−1|) is 0.057, and is between the first threshold (thr1) and the second threshold (thr2). A linear interpolation method is incorporated to obtain a weight value of 0.375. The calculation can be expressed by (thr2−|(T/C)−1|)/(thr2−thr1)*Max_wgt=0.375.

In the schematic diagram, a first area with respect to a third reference point (having coordinates of (10,23)) 133 is located within a color block of the image, and a second area with respect to the reference point covers most of the color block. Accordingly, an area brightness ratio of the third reference point 133 is larger, and the area brightness ratio with respect to the third reference point 133 may be ignored if it is too large. Therefore, the area brightness ratio that is last used and reliable can still be adopted for determining the interference pattern. It should be noted that the circuit system uses a memory to store the last reliable area brightness ratio that is last used and reliable. In the present example, an absolute value of a difference between the area brightness ratio and 1 (|(T/C)−1|) is 0.182, which is larger than the second threshold (thr2), and the corresponding weight value is 0 according to the relation curve shown in FIG. 12.

After the weight value is decided (step S309 of FIG. 3), a target matrix is determined (step S311). The weight value that is decided is used to adjust the target matrix based on the area brightness ratios of the current image and the last image. The target matrix is used to describe compensation coefficients for all of the reference points according to the weight values for all of the reference points for compensating the interference pattern. An exemplary example of adjusting the target matrix is provided as follows.

$Cur_{R\_Gain(j,i)}$, $Cur_{G\_Gain(j,i)}$ and $Cur_{B\_Gain(j,i)}$ respectively denote the area brightness ratios ($Last_{R\_Gain(j,i)}$, $Last_{G\_Gain(j,i)}$ and $Last_{B\_Gain(j,i)}$) of the red channel, the green channel and the blue channel of the current image that form a target matrix for correcting the color channels of the last image. $R_{Gain(j,i)}$, $G_{Gain(j,i)}$ and $B_{Gain(j,i)}$ form another target matrix for correcting the color channels of the current image. The target matrix is used to describe the compensation coefficients with respect to the color channels of each of the reference points. The compensation coefficients can be expressed by gain values. After the color channels are corrected, a result is applied to update the target matrix of $Last_{R\_Gain(j,i)}$, $Last_{G\_Gain(j,i)}$ and $Last_{B\_Gain(j,i)}$ that are configured to be stored to the memory of the circuit system. The weight value obtained in step S309 of FIG. 3 is used to adjust the target matrix, and the equations of the target matrix are as follows.

$$R_{Gain(j,i)} = wgt * Cur_{R\_Gain(j,i)} + (1-wgt) * Last_{R\_Gain(j,i)};$$

$$G_{Gain(j,i)} = wgt * Cur_{G\_Gain(j,i)} + (1-wgt) * Last_{G\_Gain(j,i)};$$

$$B_{Gain(j,i)} = wgt * Cur_{B\_Gain(j,i)} + (1-wgt) * Last_{BGain(j,i)}.$$

Figure 14:
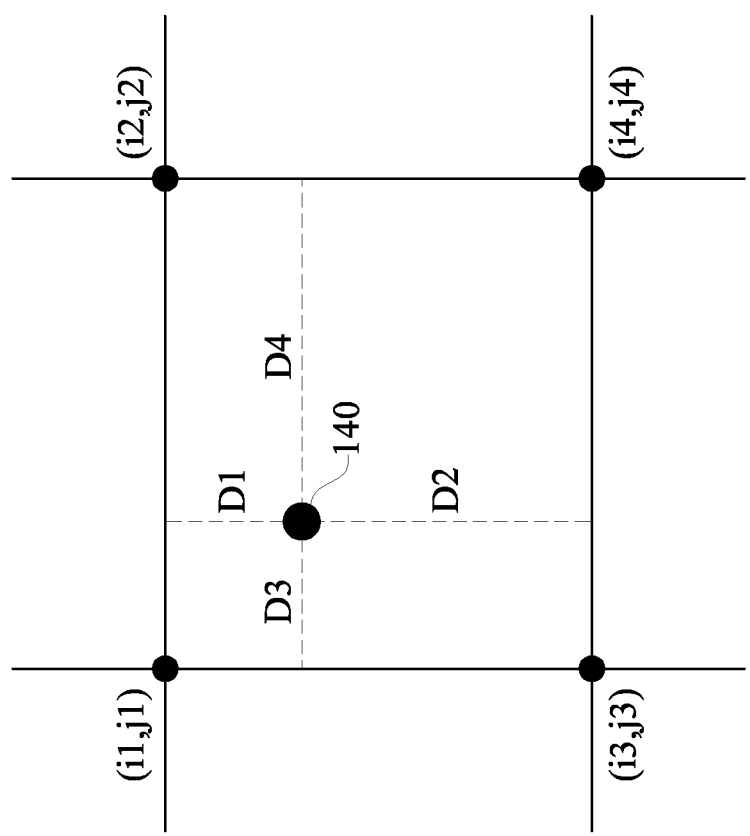
FIG. 14 is a schematic diagram depicting compensation coefficients obtained by an interpolation process in one embodiment of the present disclosure.

Finally, such as in step S313 of FIG. 3, the target matrix is used to compensate the interference pattern that is determined by the above-mentioned steps. FIG. 5 schematically shows M×N reference points (a number of the points are not limited herein) in an image. A target matrix ($R_{Gain(j,i)}$, $G_{Gain(j,i)}$ and $B_{Gain(j,i)}$) describes the compensation coefficients for every color channel of all of the reference points. A bilinear interpolation over two axial directions can be used to correct the color channels of each of the pixels of the image, thereby compensating the interference pattern. FIG. 14 is a schematic diagram depicting the correction of the color channels through the bilinear interpolation method.

FIG. 14 shows a position of a current pixel 140 and several adjacent reference points labeled as (i1,j1), (i2,j2), (i3,j3) and (i4,j4) around the current pixel 140. The pixel value of the current pixel 140 can be obtained through the bilinear interpolation method and the target matrices ($R_{Gain(j,i)}$, $G_{Gain(j,i)}$ and $B_{Gain(j,i)}$) of the reference points.

Firstly, the distances between the current pixel 140 and the adjacent reference points are calculated. For example, a distance D1 indicates a perpendicular distance between the current pixel 140 and a line formed by top-left and top-right reference points; a distance D2 indicates a perpendicular distance between the current pixel 140 and a line formed by bottom-left and bottom-right references points; a distance D3 indicates a horizontal distance between the current pixel 140 and a line formed by top-left and bottom-left references points; and a distance D4 indicates a horizontal distance between the current pixel 140 and a line formed by top-right and bottom-right reference points. Afterwards, an interpolation method can be incorporated to calculate the pixel values around the current pixel 140 according to the distances D1, D2, D3 and D4 between the current pixel 140 and the adjacent reference points. For example, the interpolation method is incorporated to calculate a red channel pixel value $R_{Gain\_Intp}$, a green channel pixel value $G_{Gain\_Intp}$ and a blue channel pixel value $B_{Gain\_Intp}$ of the current pixel 140. The pixel values of the current pixel 140 can be compensated through the following equation:

$$R_{Gain\_Intp} = (D2/(D1+D2)) \times (D4/(D3+D4)) \times R_{Gain(i1,j1)} + (D2/(D1+D2)) \times (D3/(D3+D4)) \times R_{Gain(i2,j2)} + (D1/(D1+D2)) \times (D4/(D3+D4)) \times R_{Gain(i3,j3)} + (D1/(D1+D2)) \times (D3/(D3+D4)) \times R_{Gain(i4,j4)}.$$

Figure 15:
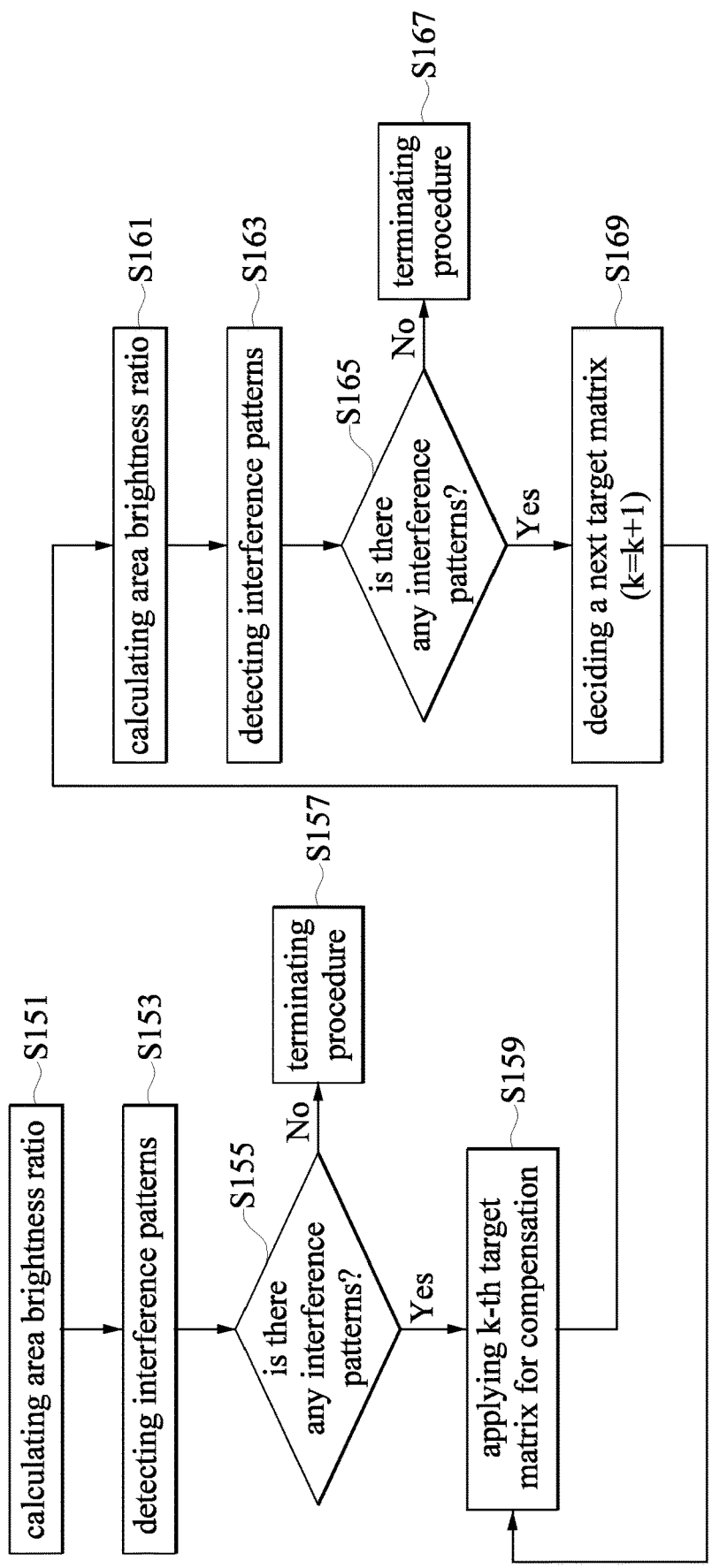
FIG. 15 is a flow chart describing a method for detecting interference patterns for the under-screen camera and compensating the interference patterns by dynamically switching target matrices according to one embodiment of the present disclosure.

Thus, through the method for detecting and compensating the interference pattern as described in the flowchart of FIG. 3, the compensated pixel values of the color channels for each of the pixels of the image can be obtained. The weight values can be used to dynamically decide the target matrices. The target matrices can be dynamically switched for dynamically compensating the interference pattern. The dynamic compensation mechanism can also be adapted to the various interference patterns that are generated due to changes of the various light sources. Reference is made to FIG. 15, which is a flow chart describing a method for detecting and dynamically compensating the interference pattern for an under-screen camera according to one embodiment of the present disclosure, and the method can be particularly adapted to various conditions due to changes of the position of interference pattern.

In step S151, such as the embodiment described in FIG. 4, the area brightness ratios of the M×N reference points in an image are calculated. In step S153, such as the embodiment described in FIG. 7, the interference pattern is detected based on the symmetrical characteristics of bright and dark stripes in the image. In step S155, it is determined whether or not any interference pattern is detected. If no interference pattern is detected, this process is terminated (step S157); otherwise, if an interference pattern is detected, the process is continued. The target matrix is obtained from a uniform gray card, and is not be affected by changes in circumstances as in the process described in FIG. 3, and the target matrices can be dynamically switched in the present process. According to the present embodiment, the circuit system provides multiple target matrices, and one of the target matrices can be selected in the method for detecting the interference pattern in order to effectively eliminate the interference pattern.

In step S159, in an exemplary example of the method, a k-th target matrix is applied for compensating the interference pattern. The target matrix formed from the color channels of the M×N reference points is used to calculate the pixel values of the color channels for each of the pixels through an interpolation method, thereby completing the compensation of the pixel values. After that, such as in step S161 the area brightness ratios of the M×N reference points are calculated by using the process as described in FIG. 4. In step S163, by the process for detecting the interference pattern as described in FIG. 7, it is determined whether or not any interference pattern is present in the image (step S165). If no interference pattern is present in the image, this process is terminated (step S167); otherwise, if any interference pattern is detected to be present in the image, in step S169, a next target matrix (k=k+1) is decided. The process returns to step S159 for performing compensation using a k+1-th target matrix. Therefore, a dynamic compensation is performed for the interference pattern by dynamically switching the target matrices until the compensation process ends.

Figure 16:
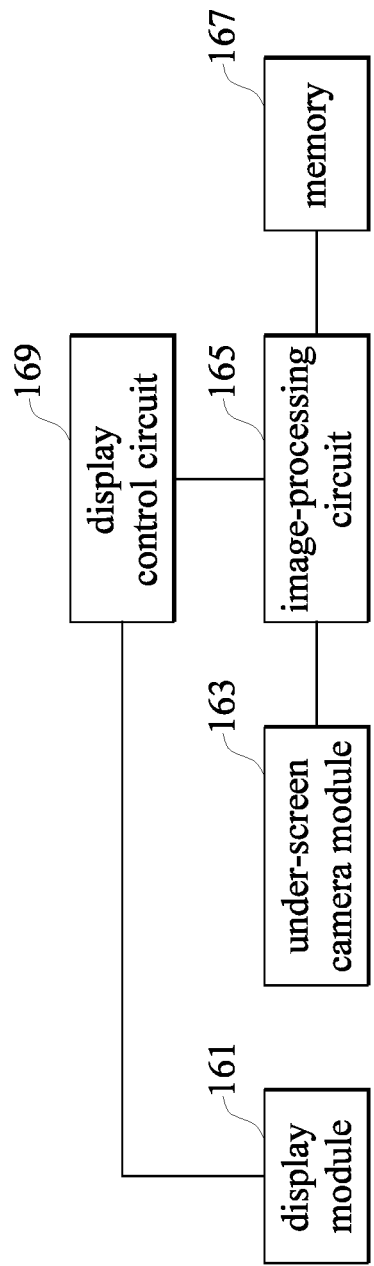
FIG. 16 is a schematic diagram depicting a circuit system that implements the method for detecting interference patterns for the under-screen camera and dynamically compensating the interference patterns according to one embodiment of the present disclosure.

FIG. 16 is a schematic diagram depicting a circuit system that performs the above-mentioned methods according to one embodiment of the present disclosure. The circuit system can be used in a mobile device which includes an under-screen camera module 163 under a display module 161. The display module 161 preferably includes a glass substrate, a display panel and a backlight module. The under-screen camera module 163 is electrically connected with an image-processing circuit 165, and the under-screen camera module 163 is used to capture an image via a lens through the glass substrate of the display module 161. The image is then transferred to the image-processing circuit 165 which is configured to detect and compensate an interference pattern. The image is stored in a memory 167, and the memory 167 also stores multiple target matrices which are used to perform a dynamic compensation on the interference pattern. After the compensation is completed, a display control circuit 169 of the circuit system is used to display the compensated image in the display module 161.

In summation, according to the above embodiments of the method for detecting the interference pattern for the under-screen camera, the compensation method and the circuit system, the interference pattern is detected according to the brightness features and the symmetrical characteristics of the image, the interference pattern is such as the circular interference pattern, i.e., the rainbow rings, and the image can be compensated through a target matrix. The compensation can also be dynamically performed on the image since the position of the interference pattern may be changed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for detecting interference patterns for an under-screen camera, comprising:
   acquiring an image, wherein multiple reference points are set in the image, a first area with respect to each of the reference points is defined, and a brightness average value of the first area with respect to each of the reference points is calculated; wherein a second area with respect to each of the reference points is defined, and a brightness target value of the second area with respect to each of the reference points is calculated;

calculating an area brightness ratio according to the brightness average value of the first area and the brightness target value of the second area of each of the reference points;

obtaining a binarized image according to the area brightness ratios of all of the reference points of the image; and determining whether or not an interference pattern is present according to symmetrical characteristics of the binarized image.

2. The method according to claim 1, wherein, if the brightness target value is larger than the brightness average value, dark stripes are determined to be present near a corresponding reference point; if the brightness target value is smaller than the brightness average value, bright stripes are determined to be present near the corresponding reference point.

3. The method according to claim 2, wherein the area brightness ratio equals to the brightness target value divided by the brightness average value.

4. The method according to claim 1, wherein the interference pattern is Newton's rings, wherein the Newton's rings have wider rings near a central portion of the Newton's rings, and thinner rings away from the central portion of the Newton's rings; wherein the reference points have the same first area, and the reference points have larger second areas for portions closer to the central portion of the Newton's rings.

5. The method according to claim 1, wherein conditions that satisfy symmetrical characteristics of the binarized image that is determined to have the interference pattern include:

a quantity of black dots and a quantity of white dots at a junction of a black area and a white area of the binarized image are the same; and positional deviations of center points calculated respectively from junctions of a plurality of rings of the interference pattern are not larger than a deviation threshold.

6. The method according to claim 1, wherein positions of the interference pattern with respect to a red channel, a green channel and a blue channel of the image are different, and an interference pattern compensation is performed on different color channels of the image by calculating the area brightness ratios with respect to the different color channels for each of the reference points.

7. The method according to claim 6, wherein the area brightness ratios with respect to the different color channels for each of the reference points are divided by each other for highlighting boundaries of one of the interference patterns so as to increase an accuracy of detecting the one of the interference patterns.

8. A compensation method for compensating interference patterns adapted to an under-screen camera, comprising:

acquiring an image, wherein multiple reference points are set in the image, a first area with respect to each of the reference point is defined, and a brightness average value of the first area with respect to each of the reference points is calculated; a second area with respect to each of the reference points is defined, and a brightness target value with respect to the second area is calculated;

calculating an area brightness ratio according to the brightness average value and the brightness target value for each of the reference points;

obtaining a binarized image according to the area brightness ratios for all of the reference points;

determining if an interference pattern is present according to symmetrical characteristics of the binarized image;

deciding a weight value with respect to the area brightness ratio of each of the reference points; and deciding a target matrix that describes compensation coefficients for all of the reference points according to the weight values for all of the reference points for compensating the interference pattern.

9. The compensation method according to claim 8, wherein, if the brightness target value is larger than the brightness average value, it is determined that there are dark stripes near a corresponding reference point; if the brightness target value is smaller than the brightness average value, it is determined that there are bright stripes near the corresponding reference point.

10. The compensation method according to claim 9, wherein the area brightness ratio equals to the brightness target value divided by the brightness average value.

11. The compensation method according to claim 8, wherein the interference pattern is Newton's rings, in which the Newton's rings have wider rings near a central portion, and thinner rings away from the central portion; the reference points have the same first area but the larger second area for the portion closer to the central portion of the Newton's rings.

12. The compensation method according to claim 11, wherein conditions that satisfy the symmetrical characteristics of the binarized image that is determined to have the interference pattern include:

numbers of black dots and white dots at a junction of a black area and a white area of the binarized image are the same; and deviation of positions of a center point calculated from junctions of a plurality of rings of the interference pattern is not larger than a deviation threshold.

13. The compensation method according to claim 8, wherein the positions of the interference patterns with respect to red channel, green channel and blue channel of the image are different, and interference pattern compensation is performed on different color channels of the image by calculating the area brightness ratios with respect to different color channels for each of the reference points.

14. The compensation method according to claim 13, wherein the area brightness ratios of different color channels for each of reference points are divided with each other for highlighting boundaries of the interference pattern so as to improve accuracy of detecting the interference pattern.

15. The compensation method according to claim 13, wherein, a target matrix for the different color channels of the image is obtained, and the target matrix is used to compensate the different color channels of the image.

16. The compensation method according to claim 15, wherein the target matrix describes compensation coefficients for each of the reference points in the image, and a bilinear interpolation process is performed to correct each of the color channels of every pixel of the image so as to compensate the interference pattern of the image.

17. The compensation method according to claim 16, wherein multiple target matrices are used to dynamically compensate the interference pattern by switching the multiple target matrices.

18. A circuit system, comprising:

an image-processing circuit; and an under-screen camera module electrically connected with the image-processing circuit and disposed inside a display module, wherein the under-screen camera module is used to capture an image with a lens of the under-screen camera module through a glass substrate of the display module, and the image is transferred to the image-processing circuit used to detect and compensate an interference pattern in the image, wherein the method for compensating the interference pattern includes:

setting multiple reference points in the image, wherein a first area with respect to each of the reference point is defined, and a brightness average value of the first area with respect to each of the reference points is calculated; a second area with respect to each of the reference points is defined, and a brightness target value with respect to the second area is calculated;

calculating an area brightness ratio according to the brightness average value and the brightness target value for each of the reference points;

obtaining a binarized image according to the area brightness ratios for all of the reference points;

determining if an interference pattern is present according to symmetrical characteristics of the binarized image;

deciding a weight value with respect to the area brightness ratio of each of the reference points; and deciding a target matrix that describes compensation coefficients for all of the reference points according to the weight values for all of the reference points for compensating the interference pattern.

19. The circuit system according to claim 18, wherein the interference pattern is Newton's rings, wherein the Newton's rings have wider rings near a central portion of the Newton's rings, and thinner rings away from the central portion of the Newton's rings; wherein the reference points have the same first area, and the reference points have larger second areas for portions closer to the central portion of the Newton's rings.

20. The circuit system according to claim 18, wherein positions of the interference patterns with respect to a red channel, a green channel and a blue channel of the image are different, and an interference pattern compensation is performed on different color channels of the image by calculating the area brightness ratios with respect to the different color channels for each of the reference points.

* * * * *